Sept. 19, 1961  L. G. OXFORD  3,000,077
CUTTING AND ABRADING TOOLS
Filed Dec. 23, 1957  3 Sheets-Sheet 1
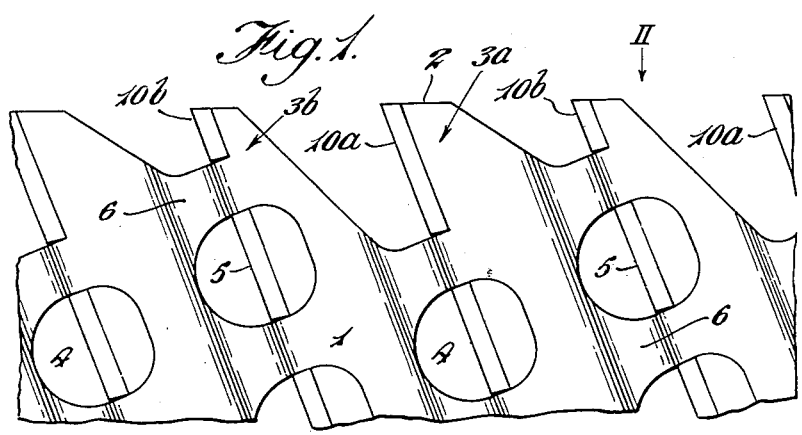
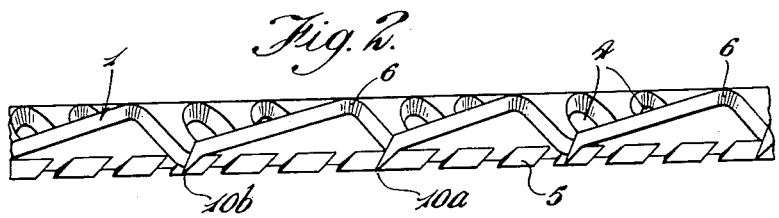
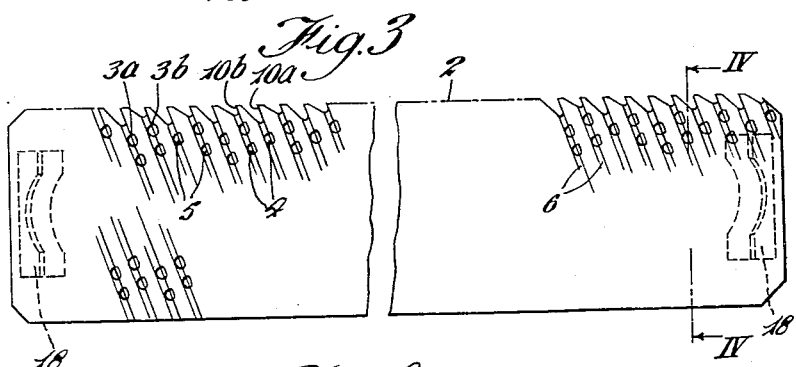
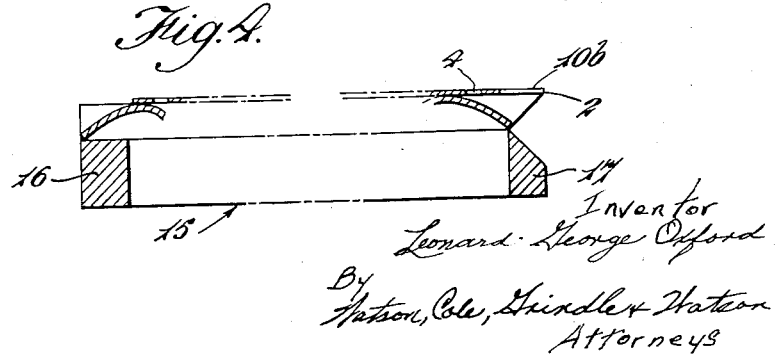
Inventor
Leonard George Oxford
By Watson, Cole, Grindle & Watson
Attorneys

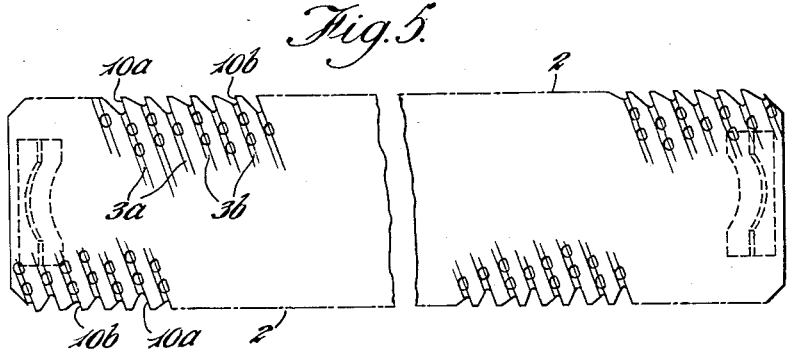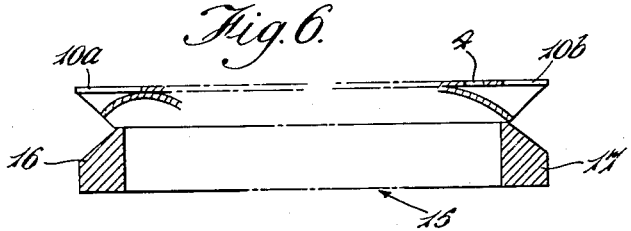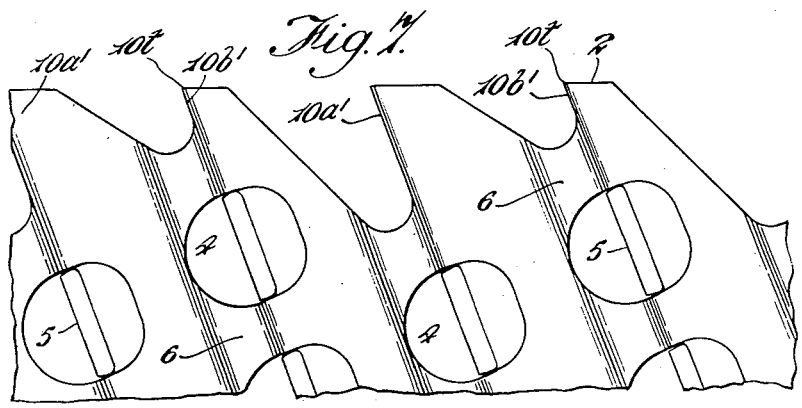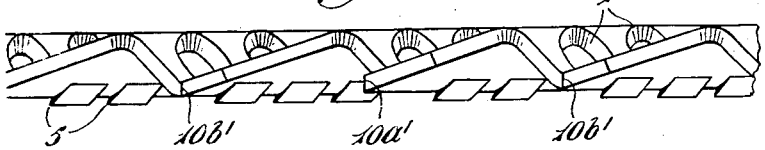

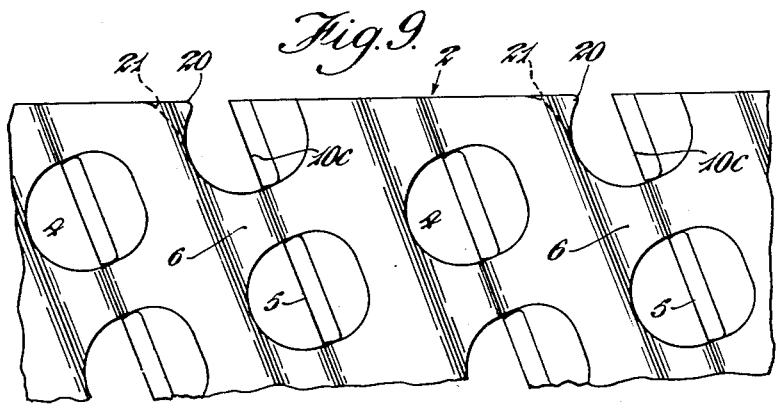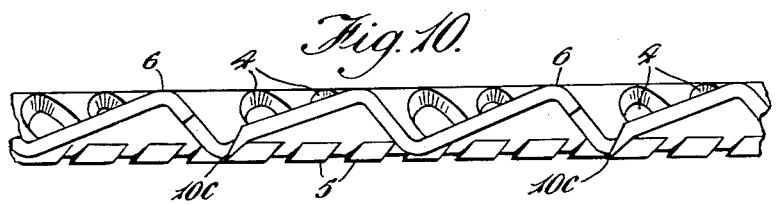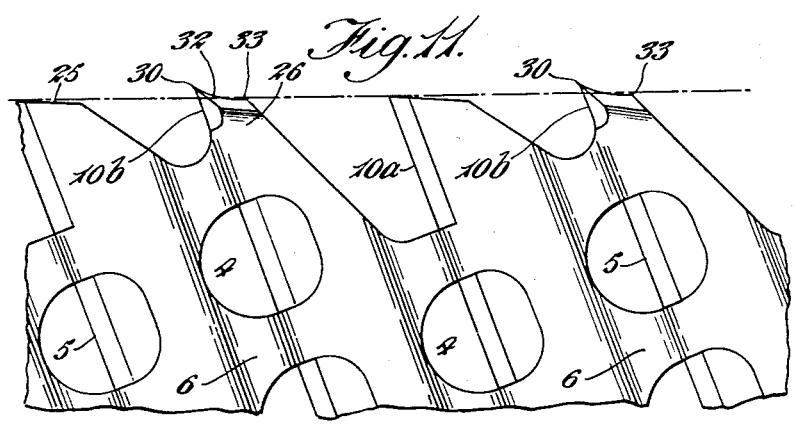

United States Patent Office 3,000,077
Patented Sept. 19, 1961

3,000,077
CUTTING AND ABRADING TOOLS
Leonard George Oxford, Haywards Heath, England, assignor to Simmonds Aerocessories Limited, Glamorganshire, Wales, a British company
Filed Dec. 23, 1957, Ser. No. 704,745
Claims priority, application Great Britain Dec 21, 1956
8 Claims. (Cl. 29—78)

This invention relates to cutting and abrading tools. U.S. Patent No. 2,678,571 of May 18, 1954 describes a cutting element for a cutting or abrading tool, consisting of a thin flexible strip or sheet of hardenable steel or hardenable iron alloy having a multiplicity of holes formed therein and sharp cutting edges upset from the strip or sheet of which each is constituted by portions of the edge of a hole, each has a clearance angle relative to the surface of the strip or sheet and each has its cutting edge differentially hardened relative to the remainder of the strip or sheet. U.S. Patent No. 2,769,225 of November 6, 1956 describes an advantageous form of such cutting element (hereinafter referred to as of "the kind described"), comprising a sheet or strip having parallel rows of holes, each hole having one side sharpened and hardened, the sheet or strip being reversely bent along lines parallel to the rows of holes into a succession of ridges with the sharpened edges extending from the ridges above the general plane formed by the ridges and at a suitable angle for cutting, to the said plane.

Cutting elements according to the aforementioned patents are commonly made in the form of strips which are mounted on a backing member providing a handle and a pair of spaced parallel narrow strip-like supporting surfaces in contact with the rear surface of the side edge portions of the cutting element so as to prevent its flexing in use, these edge portions having no holes or teeth. For some uses it is a disadvantage of such a hand tool that the area of the element carrying cutting edges does not extend to a side edge of the element, e.g. for cutting up to corners, and one object of the invention is to overcome this disadvantage. A subsidiary object of the invention is to provide a cutting element suitable for use as a saw as well as an abrading tool.

The invention accordingly provides a cutting element in strip form of the kind described wherein at least one side edge of the strip portions are cut away between at least some of the pairs of adjacent ridges to leave side cutting edges, so that the element can cut work up to said side edge. Preferably, at said one side edge or at each side edge there is a side cutting edge aligned with each rib. If the cutting edges just described are provided simply by shearing cut-outs along the side edge, they will cut up to the side edge of the element, in use thereof to abrade, for example, up to a shoulder: however the side cutting edges will be less efficient than the cutting edges at the holes. To overcome this disadvantage it is preferred that said cutting edges extend from the ridges above the general plane formed thereby and at a suitable angle for cutting, to said plane, each cutting edge being aligned with the corresponding ridge, facing in the same general direction as the sharpened edges of the holes, and being sharpened and hardened.

Various embodiments of the invention will now be described by way of example with reference to the accompanying drawings, in which:

FIGURE 1 is a plan view of a small edge portion of a cutting element for use in a hand abrading tool of file or rasp type, the element having side cutting edges at one side edge only;

FIGURE 2 is a side view of the portion shown in FIGURE 1, the view being taken in the direction of the arrow II in FIGURE 1;

FIGURE 3 is a plan view of the entire cutting element on a smaller scale than that of FIGURES 1 and 2;

FIGURE 4 is a section of the cutting element supported on a backing member;

FIGURES 5 and 6 are plan and sectional views respectively similar to FIGURES 3 and 4 of a cutting element similar to that of FIGURES 1 to 4 but having cutting edges at both side edges;

FIGURES 7 and 8 are plan and side views respectively of a simplified form of the cutting element of FIGURES 1 to 4;

FIGURES 9 and 10 are plan and side views respectively of a further form of cutting element, and FIGURES 11 and 12 are plan and side views respectively of another form of cutting element having the form of a saw.

Referring to the drawings, the cutting element, designated generally 1, is generally similar, apart from the portion adjacent one edge 2, to the element described in U.S. Patent No. 2,769,225, both in configuration and manufacture. Features common to the illustrated blade 1 and that of the Patent No. 2,769,225 will therefore not be discussed in detail. As will be seen, the cutting element 1 is in the form of a strip and has a series of parallel rows 3a, 3b of holes 4 running obliquely to the length of the element, each hole having one straight side 5 parallel to the rows 3a, 3b and sharpened to form a cutting edge. The strip is reversely bent along lines parallel to the rows 3a, 3b into a succession of ridges 6 with the sharpened edges 5 extending from the ridges above the general plane formed by the ridges and at a suitable angle for cutting, to the said plane.

The holes 4 in alternate rows 3a or 3b are similarly placed but the holes in one row (say 3a) are staggered in relation to the holes in the rows (3b) next before and behind to ensure cutting over the whole of the area of the element 1 which contains holes.

The portion of the element adjacent the edge 2 is cut away in a general saw-tooth pattern to leave a series of edges 10a, 10b (one for each ridge 6) parallel to the rows 3a, 3b, each of the edges 10a, 10b lying level and parallel to the edges 5 in one of the rows 3a, 3b.

The edges 10a, 10b are alternately short and long and the cut-away portions alternately small and large depending on the distance from the side edge 2 to the corresponding hole 4 nearest thereto. The longer cutting edges 10b all extend from the side edge 2 sufficiently inwardly thereof so that when the element 1 is moved forwardly over work to be cut the longer cutting edges 10b and the sharpened edges 5 of the extreme holes 4 in the intervening rows 3b leave no uncut work between them. The sizes of the cut-away portions are such that the cutting edges 10a, 10b are adequately supported in the direction of cut and such that enough of the troughs between the ridges 6 are left whereby when the element is assembled on the backing member (as described below) each trough is received thereon.

As has been mentioned, the cutting element is made by the method disclosed in U.S. Patent No. 2,769,225; the portions at the edge 2 between the ridges 6 are cut out in the same operation as that in which the holes 4 are formed, and the cutting edges 10a, 10b are formed in the same operation as the sharpened edges 5 of the holes 4 and have the same rake and clearance angles.

The element 1 is supported on a backing member 15 so that the combination provides a hand tool (not shown in its entirety). The backing member 15 (FIG. 4) consists of rigid side members 16, 17 interconnected at their ends, each member underlying the portion of the element 1 adjacent one of its side edges. The member 17 adjacent the side edge 2 is chamfered so as to support the element over spaced parts of a line as opposed to spaced parts of an area as is the case with the side member 16 and the opposite side portion of the element. Thus swarf cut by any of the edges 5, 10a, 10b is able to escape through to the rear of the element 1.

Lugs 18 (FIG. 3) on the rear side of the element enable it to be detachably secured to the backing member.

The cutting element 1 of FIGURES 1 to 4 may be modified to have side cutting edges 10a, 10b on each side, as shown in FIGURES 5 and 6, where parts equivalent to those above described have the same numerals. No further description of this modification will be required.

FIGURES 7 and 8 show a simplified form of the cutting element of FIGURES 1 to 4 where the side cutting edges are not sharpened or hardened.

Parts similar to those of FIGURES 1 to 4 are given the same reference numerals, but the side cutting edges are designated 10a', 10b', and are simply sheared at the side edge 2; this shearing need not be done when the holes 4 are formed but may instead be effected at the same time as an indexing margin is removed from the side of the element. (Such a margin conveniently has notches to locate a continuous strip being fed through the presses that effect the various operations by which the cutting element is formed, the margin being removed in a last operation before the strip is cut into lengths).

Though this form of element shown in FIGURES 7 and 8 may obviously be less satisfactory than the element 1 of FIGURES 1 to 4, it will be sufficient for some purposes.

In particular it should be noticed that the tips 10t of the side cutting edges 10a', 10b' will be fairly sharp on account of the shearing on two intersecting planes by which they are formed, and will be better able to cut than the edges 10a', 10b' themselves. When the element is used there will normally be some component of motion perpendicular to the side edge 2 and this together with the greater component parallel to the edge 2 will result in cutting by the tips 10t; much of the cutting over the area adjacent the side edge 2 may in fact be performed by the tips 10t. Cutting by the tips 10t can be improved by setting them down to the level of the edges 5.

The element may be made from a carbon steel of spring quality which is hardened and tempered after the steps in which the ridges 6 and edges 10a, 10b are formed. The element may alternatively be made from a mild steel and surface-hardened after said steps (e.g. by a cyanide process or by the gaseous diffusion of tungsten chromium or such metal). In either case the unsharpened edges 10a' 10b' and tips 10t will be hard enough not to be excessively worn in use.

The element illustrated in FIGURES 9 and 10 is made by forming an element which extends beyond the desired final width and shearing it off longitudinally to form the side edge 2 (parts similar to those of FIGURES 1 to 4 are given the same reference numerals). This produces one side cutting edge 10c at alternate ribs, instead of the one at every rib as in FIGURES 1 to 4. To eliminate the weak and useless points 20 it is preferred to shear the strip along the lines shown dotted at 21. Elements such as shown in FIGURES 9 and 10 are preferably made of mild steel for flexibility: the cutting edges are hardened by subjecting the entire element to a surface-hardening treatment.

FIGURES 11 and 12 illustrate a cutting element of the general kind shown in FIGURES 1 to 4 adapted for use as a saw. The side cutting edges 10a of this element are similar to those of FIGURES 1 to 4 (similar parts being again given the same reference numerals) except that they have end clearance at 25. The projections 26 which in FIGURES 1 to 4 carry the edges 10b in this form of element bent so as to extend across the thickness of the element from the general plane 27 of its front or working area to the general plane 28 of its rear, with the tip 29 of each projection 26 extending just beyond this latter plane. The projection presents a first cutting edges 30 having positive rake and clearance angles and the tip 29 has clearance at 31. The projection 26 as seen in dotted lines in FIGURE 1 is slightly concave (at 32) towards the work so that the rear edge 33 can contact the work and prevent the edge 30 cutting to excessive depth and jamming the tool. The side cutting edges 10a can be set slightly toward the front at their tips.

The cutting element in FIGURES 11 and 12 can not only cut work right up to its side edge 2, but can saw along that edge if suitably supported on a backing member with its edge 2 overhanging that member. The element of FIGURES 11 and 12 can be made in the same general way as the element of FIGURES 1 to 4, though the projections 26 in unbent condition will extend in the general direction of the ridges further than the side cutting edges 10a. Cutting edges 10a and 30 are formed as before, and the bending over of the projections 26 forms the last operation on the element apart from attachment of the logs, severance, or the like. The tips 29 of the projections 26 will be sufficiently sharp as a result of the shearing on intersecting lines to which they are subjected.

An element such as just described may advantageously be made as an endless band and incorporated in a band saw, the band saw being thereby enabled to act also as a continuous abrading band.

I claim as my invention:

1. A cutting tool comprising a thin flexible cutting strip, and backing means to support the strip in contact with a work; the cutting strip being of hardenable ferrous material having a multiplicity of holes in parallel rows, a multiplicity of cutting edges each composed of one sharpened and hardened edge of a hole, and ridges formed by reversely-bending the strip along lines parallel to the rows of holes, the edges extending from the ridges above the general plane formed thereby, the strip also having at alternate ridges along one side edge, side cutting edges which are aligned with the edges at the corresponding ridges and are formed by cutting away portions of the strip at that side, the cutting edges at the holes and at the sides overlapping for continuous cutting up to said side; and the backing means leaving the portion of the strip freely projecting at said side.

2. A cutting tool according to claim 1, in which the backing means provides a side frame member which, remote from the cutting strip, presents a surface perpendicular to the strip and aligned with said side thereof.

3. A cutting tool comprising a thin flexible cutting strip, and backing means to support the strip in contact with a work; the cutting strip being of hardenable ferrous material having a multiplicity of holes in parallel rows, a multiplicity of cutting edges each composed of one sharpened and hardened edge of a hole, and ridges formed by reversely-bending the strip along lines parallel to the rows of holes, the edges extending from the ridges above the general plane formed thereby, the strip also having, at alternate ridges along one side edge, side cutting edges which are aligned with the edges at the corresponding ridges and are formed by cutting away portions of the strip at that side, the cutting edges at the holes and at the sides overlapping for continuous cutting up to said side; and the backing means leaving the portion of the strip freely projecting at said side, at least a number of the side cutting edges being bent at an abrupt angle to the general plane of the adjacent part of the cutting strip and extend from the front face to just beyond the rear face to provide saw edges at said one side; and the backing means being in the form of a frame to which the cutting strip is secured, the side cutting edges being sharpened and projecting above the ridges to the same height as the edges at the holes.

4. A cutting tool comprising a thin flexible cutting strip composed of a hardened ferrous material having a multiplicity of holes in parallel rows, a multiplicity of cutting edges each formed by one sharpened and hardened edge of a hole, and ridges formed by reversely-bending the strip along lines parallel to the rows of holes, the edges extending from the ridges above the general plane formed thereby, the strip also having, alternate ridges along one side edge, side cutting edges which are aligned with the edges at the corresponding ridges and are formed by cutting away portions of the strip at that side, and the cutting edges at the holes and at the sides overlapping for continuous cutting up to said side.

5. A cutting tool comprising a thin flexible cutting strip of hardened ferrous material with a multiplicity of holes in parallel rows with the holes in alternate rows being staggered relative to the holes in the intermediate rows, a multiplicity of cutting edges each formed by one sharpened and hardened edge of a hole, and ridges formed by reversely-bending the strip along lines parallel to the rows of holes, each pair of adjacent ridges having a trough between them, the edges extending from the ridges above the general plane formed thereby, the strip at each ridge along one side edge having side cutting edges which are aligned with the edges at the holes of each row and alternately long and short relative to each other, the cutting edges at the holes and at the sides overlapping for continuous cutting up to said side, and a cutout diverging towards said side for each side cutting edge formed by making one margin of the cutout starting from said one side at a position spaced behind the crest of the adjacent ridge ahead of the edge and extending to a position directly in front of said edge and at the bottom of the trough just ahead thereof, and the metal supporting the edge thereby extending the full distance from ridge to trough as seen along the lines of edges.

6. A cutting tool according to claim 1, in which the backing means comprises a frame member at said side of the strip with each member having a section tapering towards the element and contacting the rear thereof at points along a line which runs parallel to said side spaced just inwardly of the side cutting edges.

7. A cutting tool as claimed in claim 4, having side cutting edges at alternate ridges terminating at the front face of the strip and, intermediate adjacent pairs of said side cutting edges, tongues extending from the body of the strip and presenting sharpened tips just beyond the rear face of the strip.

8. A cutting tool comprising a thin flexible cutting strip, and backing means to support the strip in contact with a work; the cutting strip being of hardenable ferrous material having a multiplicity of holes in parallel rows, a multiplicity of cutting edges each composed of one sharpened and hardened edge of a hole, and ridges formed by reversely-bending the strip along lines parallel to the rows of holes, the edges extending from the ridges above the general plane formed thereby, the strip also having, at alternate ridges along one side edge, side cutting edges which are aligned with the edges at the corresponding ridges and are formed by cutting away portions of the strip at that side, the cutting edges at the holes and at the sides overlapping for continuous cutting up to said side; and the backing means leaving the portion of the strip freely projecting at said side having side cutting edges at alternate ridges terminating at the front face of the strip, intermediate adjacent pairs of said side cutting edges, tongues extending from the body of the strip and presenting sharpened tips just beyond the rear face of the strip, said tongues each comprising a portion providing a side cutting edge and a further portion forming a continuation of the first portion and terminating in said tip, and said further portion being bent back rearwardly from the first portion and providing a cutting edge extending entirely across the thickness of the strip.

References Cited in the file of this patent

UNITED STATES PATENTS

| | | |
|---|---|---|
| 289,104 | How | Nov. 27, 1883 |
| 818,633 | Lord | Apr. 24, 1906 |
| 1,751,034 | Erb | Mar. 18, 1930 |
| 2,143,063 | Fetterolf | Jan. 10, 1939 |
| 2,678,571 | Booth | May 18, 1954 |
| 2,769,225 | Booth | Nov. 6, 1956 |
| 2,839,817 | Huxtable | June 24, 1958 |

FOREIGN PATENTS

| | | |
|---|---|---|
| 4,356 | Great Britain | Feb. 22, 1909 |